United States Patent
Liu et al.

(10) Patent No.: US 11,293,833 B2
(45) Date of Patent: Apr. 5, 2022

(54) METHODS AND SYSTEMS RELATING TO EMBEDDED OPTICAL TIME DOMAIN REFLECTOMETRY

(71) Applicant: Viscore Technologies Inc., Ottawa (CA)

(72) Inventors: Yunqu Liu, Kanata (CA); Kin-Wai Leong, Ottawa (CA)

(73) Assignee: VISCORE TECHNOLOGY INC., Ottawa (CA)

( * ) Notice: Subject to any disclaimer, the term of this patent is extended or adjusted under 35 U.S.C. 154(b) by 0 days.

(21) Appl. No.: 14/624,916

(22) Filed: Feb. 18, 2015

(65) Prior Publication Data

US 2015/0233785 A1    Aug. 20, 2015

Related U.S. Application Data

(60) Provisional application No. 61/940,568, filed on Feb. 17, 2014.

(51) Int. Cl.
   *G01M 11/00*   (2006.01)
(52) U.S. Cl.
   CPC .... *G01M 11/3127* (2013.01); *G01M 11/3154* (2013.01)
(58) Field of Classification Search
   USPC ........................................................ 356/73.1
   See application file for complete search history.

(56) References Cited

U.S. PATENT DOCUMENTS

| | | | | |
|---|---|---|---|---|
| 2005/0174578 A1* | 8/2005 | Wei | ........................ | A61B 3/102 356/477 |
| 2006/0280399 A1* | 12/2006 | Nebendahl | ......... | G01M 11/3172 385/15 |
| 2010/0172614 A1* | 7/2010 | Oota | ................... | G01M 11/3127 385/45 |
| 2012/0170046 A1* | 7/2012 | Flanders | ............ | G01B 9/02004 356/479 |

* cited by examiner

*Primary Examiner* — David Payne
*Assistant Examiner* — Omar S Ismail
(74) *Attorney, Agent, or Firm* — Rosenberg, Klein & Lee

(57) ABSTRACT

The deep penetration of optical transmission from the very edges of the network with optical access networks to the very core with routing data within data centers before transmission has resulted in competing demands for increased functionality, reduced cost, enhanced manufacturability, and reduced footprint. At the same time monitoring and fault detection with prior art optical time domain reflectometry systems have not kept up to the demands of these networks and systems as they are expensive test equipment based solutions. It would be beneficial to provide embedded OTDR functionality within each transmitter, receiver or transceiver deployed within the network allowing every link to be monitored continuously. It would be further beneficial for such embedded OTDRs to meet the demands for lower cost, high volumes, and smaller footprints with enhanced manufacturability.

14 Claims, 7 Drawing Sheets

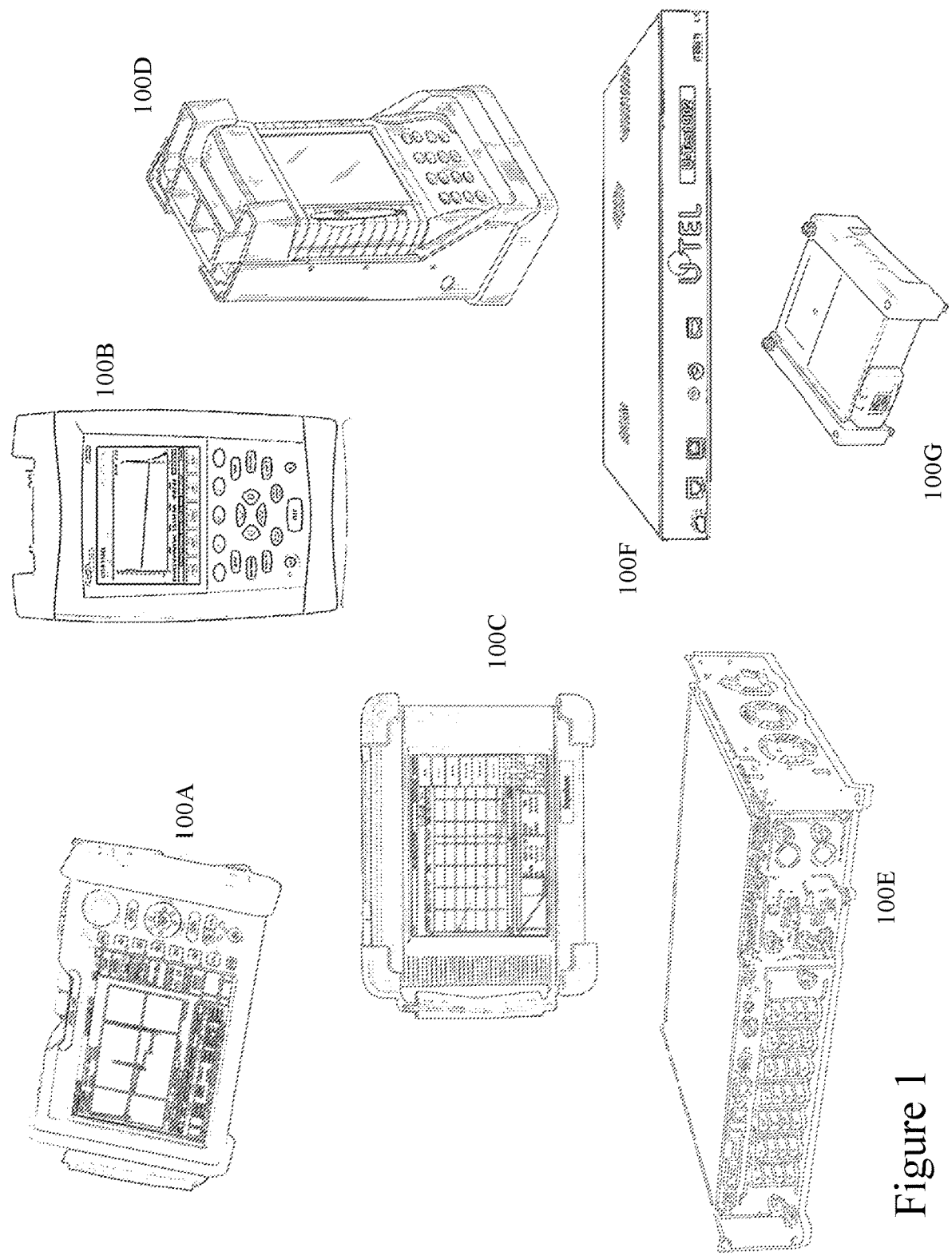

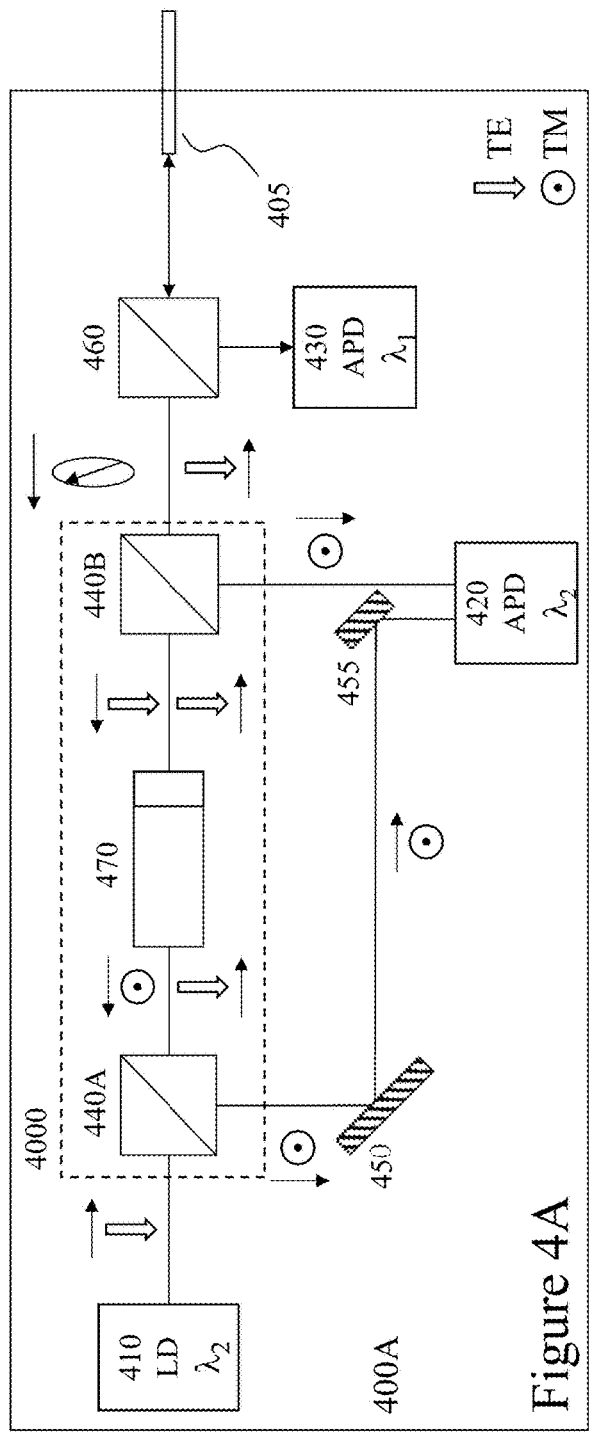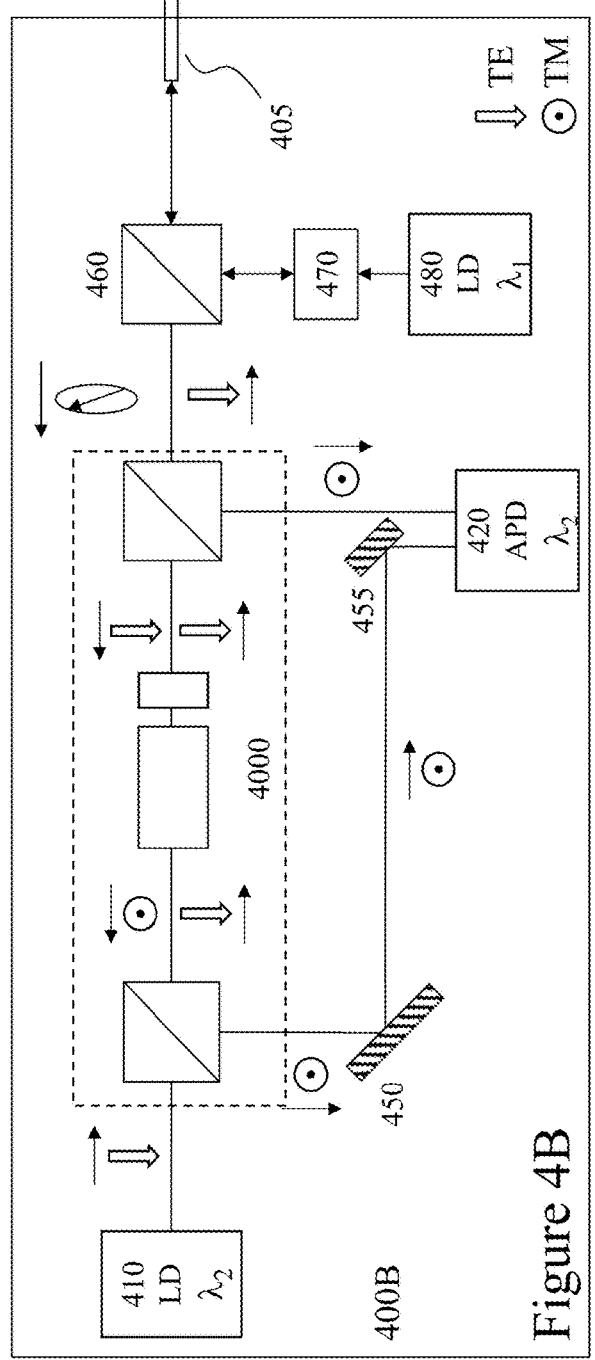
Figure 4A
Figure 4B

METHODS AND SYSTEMS RELATING TO EMBEDDED OPTICAL TIME DOMAIN REFLECTOMETRY

CROSS-REFERENCE TO RELATED APPLICATIONS

This patent application claims the benefit of U.S. Provisional Patent Application 61/940,568 filed Feb. 17, 2014 entitled "Methods and Systems relating to Embedded Optical Time Domain Reflectometry", the entire contents of both patent applications being included by reference.

FIELD OF THE INVENTION

This invention relates to optical time domain reflectometry (OTDR) and more particularly to embedding OTDR functionality into transmitters, receivers and transceivers.

BACKGROUND OF THE INVENTION

The deep penetration of optical fiber into the access networks requires an unparalleled massive deployment of the optical interface equipment that drives the traffic to and from users. For example, optical transceivers, which receive downstream signals on one wavelength and send upstream signals on another wavelength, both wavelengths sharing the same optical fiber, have to be deployed at every optical line terminal (OLT)/optical network unit (ONU). Therefore, cost efficiency, volume scalability in manufacturing of such components are major issues together with maintaining a small footprint within either the OLT/ONU or even set-top boxes of subscribers.

At the same time these access networks are typically distributing data to/from the Internet which comprises today an estimated 100 billion plus web pages on over 100 million websites as well as streaming audiovisual content from service providers and server hosted systems. Accordingly by 2016 with almost two billion users accessing this data cloud, including a growing amount of high bandwidth video, then user traffic is expected to exceed 100 exabytes per month, over 100,000,000 terabytes per month, or over 42,000 gigabytes per second. However, peak demand will be considerably higher with projections of over 600 million users streaming Internet high-definition video simultaneously at peak times.

All of this data will flow to and from users via these access networks but be sourced from data centers and accordingly additional traffic flows at significant capacity will exist between data centers and within data centers. Data centers are filled with tall racks of electronics surrounded by cable racks where data is typically stored on big, fast hard drives where in servers take requests and move the data using fast switches which access the right hard drives. At the same time as applications such as cloud computing increase computing platforms are no longer stand alone systems but homogenous interconnected computing infrastructures hosted in massive data centers known as warehouse scale computers (WSC) which provide ubiquitous interconnected platforms as a shared resource for many distributed services with requirements that are different to the traditional racks/servers of data centers. Accordingly, as with the access networks there is demand for cost efficiency and volume scalability in manufacturing of such components which will only increase as the goal to move data as fast as possible with the lowest latency, lowest cost, smallest footprint, and lowest power consumption migrates the optoelectronic interfaces to the server blades themselves.

Accordingly, there is an ongoing drive to not only reduce costs but also improve connection reliability to subscribers, enterprises, etc. with diagnostics and fault detection techniques. Today, typically, such diagnostics and fault detection techniques are applied after notification of an issue unless onerous service level agreements (SLAs) exist that financially punish a service provider in the event of outage. Amongst the diagnostic and fault detection techniques employed on optical fiber networks is optical time domain reflectometry (OTDR, a term also used to describe the test instrument providing the measurement). Within OTDR testing a series of optical pulses are injected into the optical fiber under test and extracted from the same end of the optical fiber, wherein the reflected light extracted is either that scattered inherently by the optical fiber (Rayleigh backscatter) or reflected back from points along the fiber where there are refractive index discontinuities. The former provide essentially a sloping trace on the OTDR as the Rayleigh backscatter reduces with the attenuation of the optical signal propagating down the fiber with step-wise reductions reflecting optical elements such as optical attenuators, optical isolators, etc. along the optical link whereas step-wise peaks represent discrete points of higher reflectivity, e.g. an optical fiber break wherein the optical signal now encounters a transition from the silica refractive index of the optical fiber to, typically, air. Accordingly, the strength of the return pulses is measured and integrated as a function of time, and is plotted as a function of fiber length (time). Shorter pulses allow for increased resolution in the location of the features within the OTDR results.

However, such OTDR equipment is normally a separate element within a rack of optoelectronic transceivers and is typically connected to a link to be monitored and/or tested via an optical switch so that a single OTDR can be used upon multiple channels. This is because typically OTDR devices are typically expensive test instruments providing advanced functionality and analysis algorithms, such as depicted by first to fourth OTDRs 100A to 100D in FIG. 1 or have been re-packaged for rack mounting such as fifth to seventh OTDRs 100E to 100G in FIG. 1. Fifth OTDR 100E incorporates a 1×24 optical switch which can be extended by adding additional optical switches to the outputs of the optical switch within the fifth OTDR 100E.

However, it would be evident that where an OTDR is shared across a large number of optical fibers the actual testing uptime per fiber reduces linearly with the number of fibers so that with high numbers of averaged measurements to achieve a high dynamic range and measurement times of 1-3 minutes each fiber may only be evaluated every few hours. Accordingly, it would be beneficial to provide embedded OTDR functionality within each transmitter, receiver or transceiver deployed within the network allowing every link to be monitored continuously. However, as noted above the demand is for lower cost, high volumes, and smaller footprints for optical components within network applications. Embodiments of the invention address such requirements.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to relates to relates to optical time domain reflectometry (OTDR) and more particularly to embedding OTDR functionality into transmitters, receivers and transceivers.

In accordance with an embodiment of the invention there is provided a device
a first optical emitter emitting at first predetermined wavelength;
a first optical receiver for receiving optical signals at the first predetermined wavelength;
a wavelength division multiplexer having a first port relating to optical signals at the first predetermined wavelength, a second port relating to optical signals at the first predetermined wavelength; and a third port relating to optical signals at both the first and second predetermined wavelengths; and
an optical sub-assembly coupled between the first optical emitter and the first port of the wavelength division multiplexer comprising a fourth port for receiving optical signals from the first optical emitter and coupling them to the first port of the wavelength division multiplexer and a fifth port for coupling optical signals from the wavelength division multiplexer to the first optical receiver.

In accordance with an embodiment of the invention there is provided a device comprising:
a first optical emitter emitting at a first predetermined wavelength;
a wavelength division multiplexer having a first port relating to optical signals at the first predetermined wavelength, a second port relating to optical signals at a second predetermined wavelength; and a third port relating to optical signals at both the first and second predetermined wavelengths through which optical signals are coupled to and from an optical network coupled to the device;
a first optical component coupled to the second port for either receiving optical signals at the second predetermined wavelength or generating optical signals at the second predetermined wavelength; and
an optical sub-assembly disposed between the first optical emitter and the first port of the wavelength division multiplexer for coupling the optical signals from the first optical emitter to the first port of the wavelength division multiplexer and for coupling received signals at the first predetermined wavelength from the first port of the wavelength division multiplexer to fourth and fifth ports wherein the optical signals coupled to the fourth and fifth ports are orthogonally polarized with respect to each other and the optical sub-assembly isolates the first optical emitter from received optical signals at the device at the first predetermined wavelength.

In accordance with an embodiment of the invention there is provided a device comprising:
a first optical emitter emitting at a first predetermined wavelength;
a first optical component for either receiving optical signals at a second predetermined wavelength or generating optical signals at the second predetermined wavelength;
a second optical component for either receiving optical signals at a third predetermined wavelength or generating optical signals at the third predetermined wavelength;
a first wavelength division multiplexer having a first port relating to optical signals at the first predetermined wavelength, a second port relating to optical signals at the second predetermined wavelength, a third port relating to optical signals at the third predetermined wavelength, and a fourth port relating to optical signals at the first, second and third predetermined wavelengths through which optical signals are coupled to and from an optical network coupled to the device;
an optical sub-assembly disposed between the first optical emitter and the first port of the wavelength division multiplexer for coupling the optical signals from the first optical emitter to the first port of the wavelength division multiplexer and for coupling received signals at the first predetermined wavelength from the first port of the wavelength division multiplexer to fifth and sixth ports wherein the optical signals coupled to the fifth and sixth ports are orthogonally polarized with respect to each other and the optical sub-assembly isolates the first optical emitter from received optical signals at the device at the first predetermined wavelength.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 depicts OTDR devices currently deployed within network environment as both discrete units and rack mounted units;

FIGS. 4A and 4B depict schematics of embedded OTDR functionality within receiver and transmitter components exploiting embodiments of the invention;

DETAILED DESCRIPTION

The present invention is directed to optical time domain reflectometry (OTDR) and more particularly to embedding OTDR functionality into transmitters, receivers and transceivers.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Figure 2A:
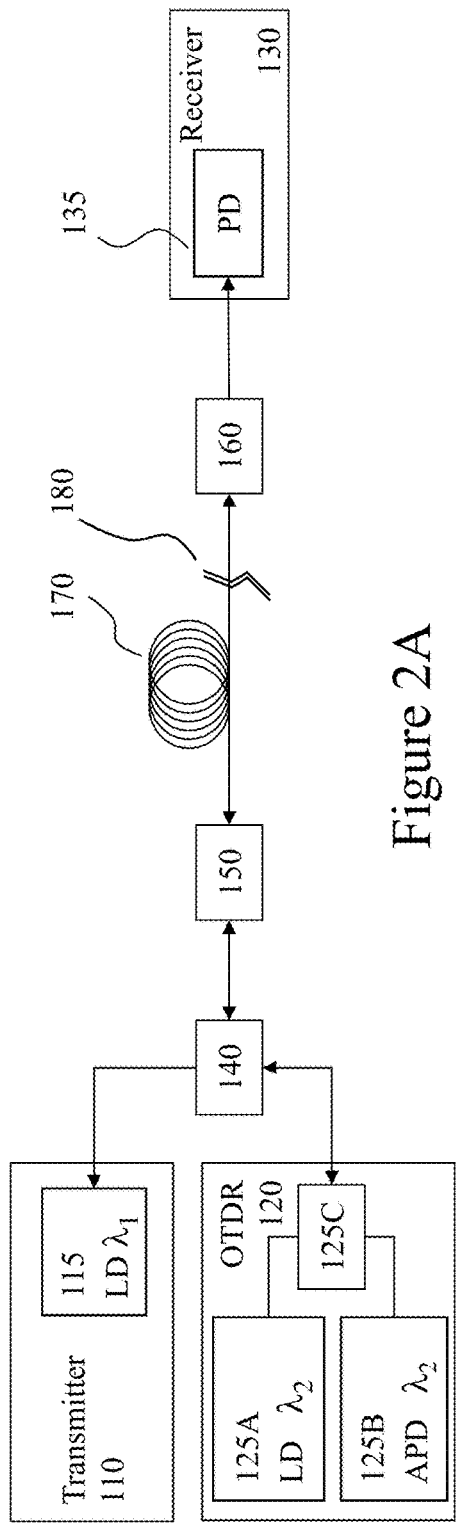
FIG. 2A depicts an OTDR deployment according to the prior art with a separate OTDR to a transmitter.

Referring to FIG. 2A there is depicted an OTDR deployment according to the prior art with a separate OTDR 120 to a transmitter 110. Accordingly, as depicted the transmitter 110 contains a laser diode (LD) operating at a first wavelength, $\lambda_1$, which is coupled to a wavelength division multiplexer (WDM) 140 before being transmitted to a receiver 130 comprising at least a photodiode (PD) 135 via first and second optical components 150 and 160 respectively and optical fiber 170 within which there is depicted a break 180. First and second optical components 150 and 160 respectively may comprise optical splitters, WDMs, optical circulators, optical amplifiers, optical isolators, and optical attenuators for example. The OTDR 120 is also coupled to the WDM 140 and comprises a LD 125A operating at a second wavelength, $\lambda_2$, hereinafter LD $\lambda_2$ 125A, and an avalanche photodiode (APD) 125B sensitive to $\lambda_2$, hereinafter APD $\lambda_2$ 125B. The APD $\lambda_2$ 125B and LD $\lambda_2$ 125A are coupled via third optical component 125C, e.g. a passive coupler or for lower insertion loss and optical circulator.

Figure 2C:
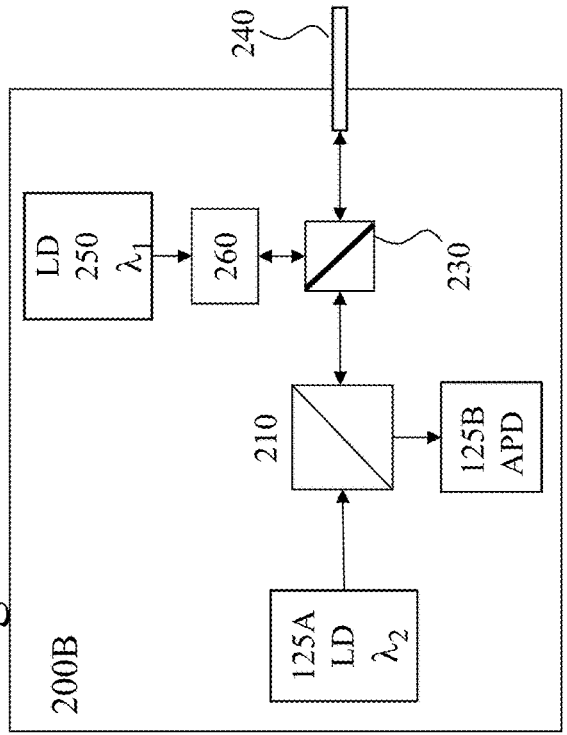
FIGS. 2B and 2C depict prior art embodiments of embedded OTDR functionality within receiver and transmitter components exploiting a passive splitter.
Figure 2B:
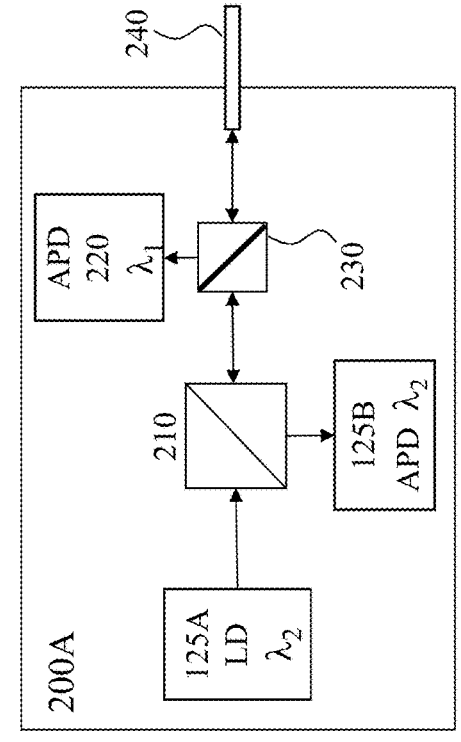

Now referring to FIGS. 2B and 2C there are prior art embodiments of embedded OTDR functionality within receiver and transmitter components exploiting a passive splitter. Referring first to FIG. 2B the Receiver with Embedded OTDR (Rx-EOTDR) 200A is depicted comprising APD $\lambda_2$ 125B and LD $\lambda_2$ 125A which are coupled via a beamsplitter 210A to a WDM filter 230 and therein the optical fiber 240 which interfaces the Rx-EOTDR 200A to the network. Also coupled to the WDM filter 230 is APD $\lambda_1$ 220. The WDM filter 230 transmits optical signals at $\lambda_2$ and reflects those at $\lambda_1$. Accordingly, the optical signal from LD $\lambda_2$ 125A is coupled straight-through to the optical fiber 240 and the optical network. Reflected optical signals at $\lambda_2$ are similarly coupled straight through the WDM filter 230. However, optical signals at $\lambda_1$ in contrast coupled from the optical fiber 240 are reflected from the WDM filter 230 to the APD $\lambda_1$ 220.

Referring first to FIG. 2C the Transmitter with Embedded OTDR (Tx-EOTDR) 200B is depicted comprising APD $\lambda_2$ 125B and LD $\lambda_2$ 125A which are coupled via a beamsplitter 210 to a WDM filter 230 and therein the optical fiber 240 which interfaces the Tx-EOTDR 200B to the network. Also coupled to the WDM filter 230 is APD $\lambda_1$ 220. The WDM filter 230 transmits optical signals at $\lambda_2$ and reflects those at $\lambda_1$. Accordingly, the optical signal from LD $\lambda_2$ 125A is coupled straight-through to the optical fiber 240 and optical network. Reflected optical signals at $\lambda_2$ are similarly coupled straight through the WDM filter 230. However, optical signals at $\lambda_1$ in contrast coupled from the laser diode, LD $\lambda_1$ 250, are coupled via an optical isolator 260 and WDM filter 230 to the optical fiber 240. Any optical signals at $\lambda_1$ reflected from the optical network to which the Tx-EOTDR 200B is connected would be coupled via the WDM filter 230 to the optical isolator 260. As an optical isolator 260 is a non-reciprocal optical device exploiting the Faraday rotation effect within magneto-optical materials such that optical signals propagating in one direction are transmitted with low insertion loss whilst those in the reverse direction suffer a high insertion loss. Accordingly, an optical isolator 260 is commonly employed in conjunction with high performance optical laser diode emitters such as external cavity lasers (ECL) and distributed feedback (DFB) lasers with narrow linewidth and high sidelobe suppression for wavelength division multiplexed links and/or networks.

However, the use of a beamsplitter 210 to couple the optical pulses from the LD $\lambda_2$ 125A to the WDM filter 230 and therein the optical fiber 240 and subsequently from the optical fiber 240 to the APD $\lambda_2$ 125B incurs a 3 dB insertion loss penalty in each direction. Accordingly, the overall reduction in the optical dynamic range between the peak optical signal from the LD $\lambda_2$ 125A to the noise floor of the APD $\lambda_2$ 125B is 6 dB. Accordingly, it would be beneficial to replace the beamsplitter 210 with an optical sub-assembly that reduces the insertion loss allowing the dynamic range of the embedded OTDR to be increased.

Figure 3A:
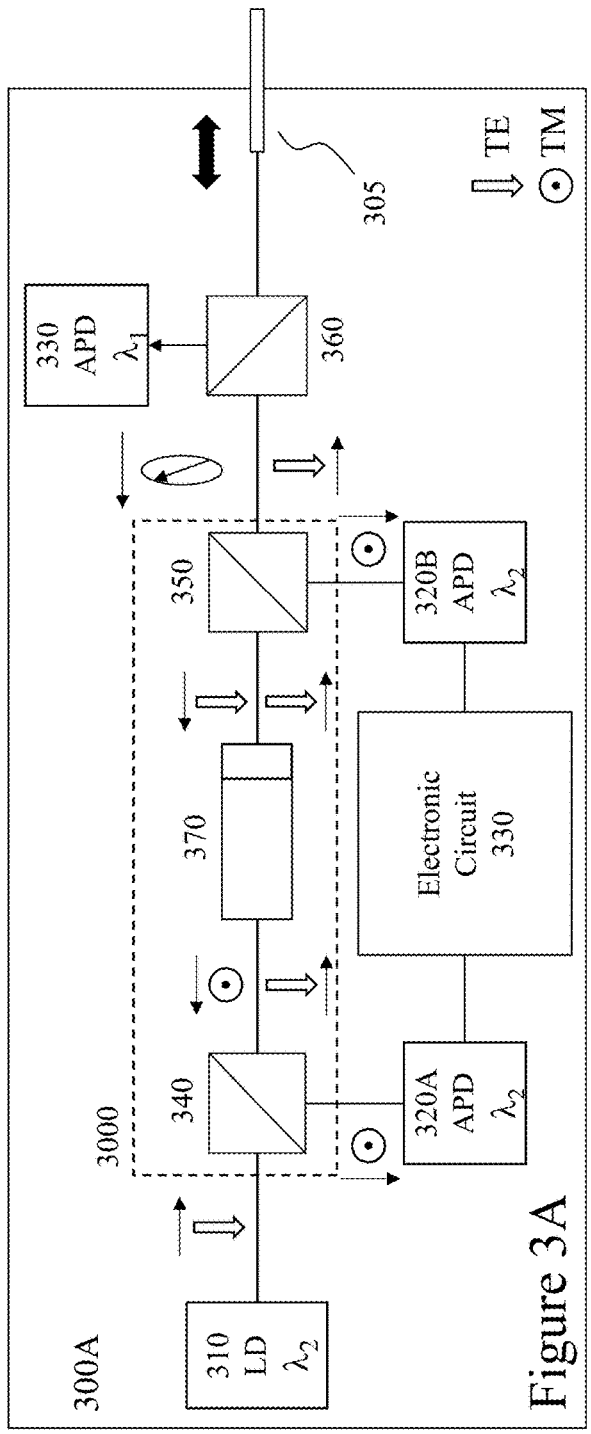
FIGS. 3A and 3B depict schematics of embedded OTDR functionality within receiver and transmitter components exploiting embodiments of the invention.
Figure 3B:
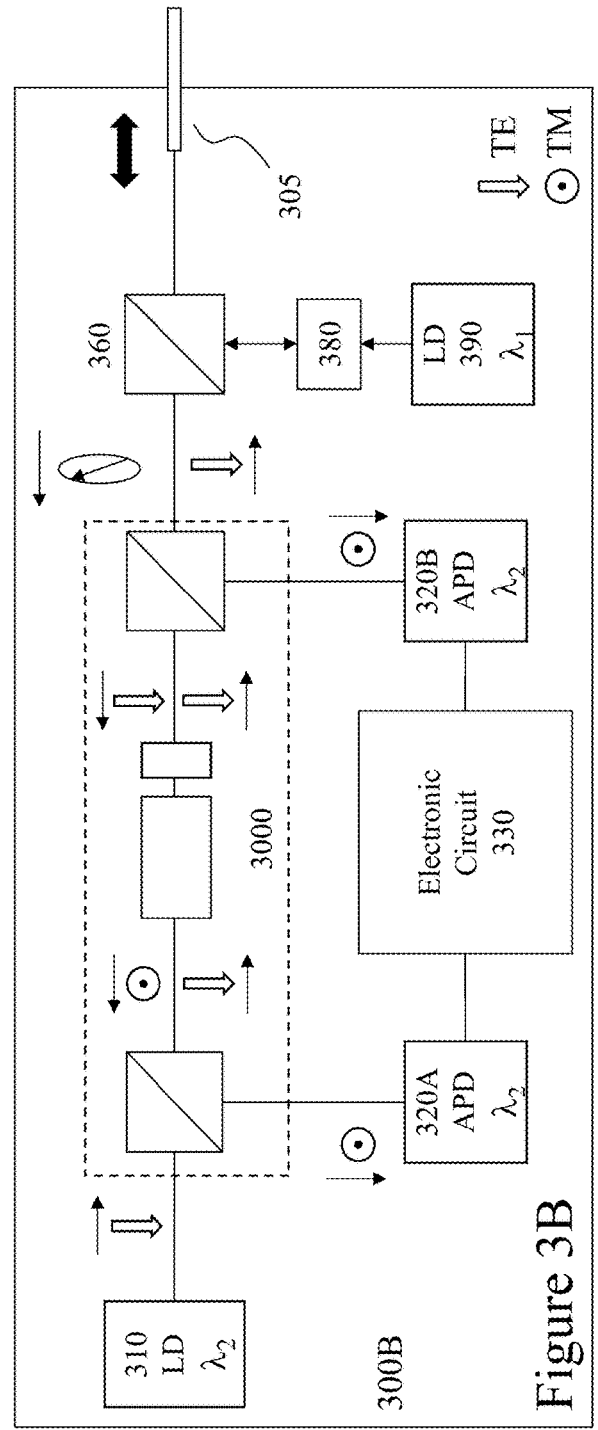

Now referring to FIGS. 3A and 3B there are depicted first and second schematics of embedded OTDR functionality within receiver and transmitter components exploiting embodiments of the invention. Referring to FIG. 3A there is depicted an Rx-EOTDR 300A comprising a WDM filter 360 which couples optical signals from the optical fiber 305 at $\lambda_1$ to the photodiode, APD $\lambda_1$ 330. The EOTDR comprises the optical pulse source, LD $\lambda_2$ 310, optical sub-assembly 3000, first and second APDs being APD $\lambda_2$ 320A and APD $\lambda_2$ 320B respectively, and electronic circuit 330. As depicted the optical pulse source LD $\lambda_2$ 310 emits in a highly linear polarization state, shown as transverse electric (TE), wherein this optical signal propagates with low attenuation through first polarization beamsplitter 340, a generalized Faraday rotator 370, and second polarization beamsplitter 350 before being coupled through the WDM filter 360 to the optical fiber 305.

Optical signals at $\lambda_2$ reflected and/or backscattered from the optical fiber 305 and subsequent network are of undefined polarization state and after coupling back through WDM filter 360 impinge upon the second polarization beamsplitter 350 wherein that portion of the optical signal in transverse magnetic (TM) is coupled to second APD, APD $\lambda_2$ 320B. That portion of the optical signal in TE polarization is coupled back through the second polarization beamsplitter 350 to Generalized Faraday rotator 370 wherein its polarization is rotated 90° to TM such that it reflects from the first polarization beamsplitter 340 to first APD, APD $\lambda_2$ 320A. Accordingly, the optical sub-assembly 3000 separates the return signal from the optical path between optical fiber 305 to LD $\lambda_2$ 310 and couples it to first and second APDs APD $\lambda_2$ 320A and APD $\lambda_2$ 320B. The electrical signals from first and second APDs APD $\lambda_2$ 320A and APD $\lambda_2$ 320B are coupled to the electronic circuit 330 wherein they are processed and coupled to external control and decision elements of the optical network control layer.

It would be evident to one skilled in the art that in order to achieve the indicated 90° rotation that the generalized Faraday rotator 370 would comprise a Faraday rotating element which provides 45° polarization rotation coupled with a half waveplate ($\lambda$/2-plate). Alternatively, in the instance that the generalized Faraday rotator 370 only comprises a Faraday rotating element that this would provide 45° downstream from the LD $\lambda_2$ 310 to the optical fiber 405 and 45° upstream. Accordingly, in this alternate embodiment of the invention the second polarization beamsplitter 350 would be rotated 45° whilst the depictions for polarization states would similarly have to be adjusted.

FIG. 3B depicts a Tx-EOTDR 300B according to an embodiment of the invention exploiting the optical configuration of the Rx-EOTDR 300A with optical sub-assembly 3000, LD $\lambda_2$ 310, first and second APDs APD $\lambda_2$ 320A and APD $\lambda_2$ 320B, and electronic circuit 330 in conjunction with WDM filter 360. Since Tx-EOTDR 300B is a transmitter the WDM filter 360 receives the optical signal emitted from laser source, LD $\lambda_1$ 390 via optical isolator 380.

Now referring to FIGS. 4A and 4B there are depicted first and second schematics of embedded OTDR functionality within receiver and transmitter components exploiting embodiments of the invention. Referring to FIG. 4A there is depicted an Rx-EOTDR 400A comprising a WDM filter 460 which couples optical signals from the optical fiber 405 optical signals from the optical fiber 405 at $\lambda_1$ to the photodiode, APD $\lambda_1$ 430. The EOTDR comprises the optical pulse source, LD $\lambda_2$ 410, optical sub-assembly 4000, APD $\lambda_2$ 420, and first and second mirrors 450 and 455 respectively. As depicted the optical pulse source LD $\lambda_2$ 410 emits in a highly linear polarization state, shown as transverse electric (TE), wherein this optical signal propagates with low attenuation through first polarization beamsplitter 440A, Generalized Faraday rotator 470, and second polarization beamsplitter 440B before being coupled through the WDM filter 460 to the optical fiber 405.

Optical signals at $\lambda_2$ reflected and/or backscattered from the optical fiber 405 and subsequent network are of undefined polarization state and after coupling back through WDM filter 460 impinge upon the second polarization beamsplitter 440B wherein that portion of the optical signal in transverse magnetic (TM) is coupled to the APD $\lambda_2$ 420. That portion of the optical signal in TE polarization is coupled back through the second polarization beamsplitter 440B to Generalized Faraday rotator 470 wherein its polarization is rotated 90° to TM such that it reflects from the first polarization beamsplitter 440A. This signal is then coupled via first and second mirrors 450 and 455 to the APD $\lambda_2$ 420. Accordingly, the optical sub-assembly 4000 separates the return signal from the optical path between optical fiber 405 to LD $\lambda_2$ 410 and couples it to APD $\lambda_2$ 420. The electrical signal from APD $\lambda_2$ 420 is coupled to external control and decision elements of the optical network control layer.

It would be evident to one skilled in the art that in order to achieve the indicated 90° rotation that the generalized Faraday rotator 470 would comprise a Faraday rotating element which provides 45° polarization rotation coupled with a half waveplate ($\lambda$/2-plate). Alternatively, in the instance that the generalized Faraday rotator 470 only comprises a Faraday rotating element that this would provide 45° downstream from the LD $\lambda_2$ 410 to the optical fiber 405 and 45° upstream. Accordingly, in this alternate embodiment of the invention the second polarization beamsplitter 440B would be rotated 45° whilst the depictions for polarization states would similarly have to be adjusted.

FIG. 4B depicts a Tx-EOTDR 400B according to an embodiment of the invention exploiting the optical configuration of the Rx-EOTDR 400A with optical sub-assembly 4000, LD $\lambda_2$ 410, APD $\lambda_2$ 420, and first and second mirrors 450 and 455 respectively in conjunction with WDM filter 460. Since Tx-EOTDR 300B is a transmitter the WDM filter 460 now receives the optical signal emitted from laser source, LD $\lambda_1$ 480 via optical isolator 470.

Figure 5A:
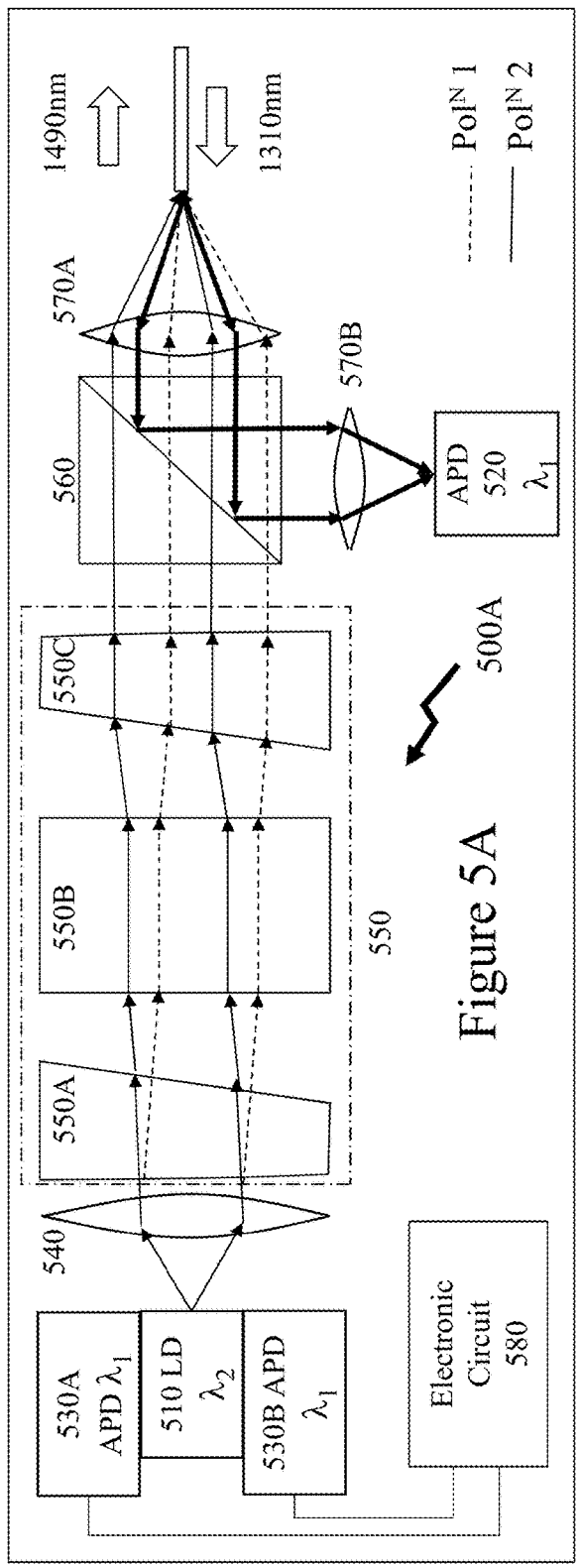
FIGS. 5A and 5B depict schematics of embedded OTDR functionality within a receiver component according to an embodiment of the invention.
Figure 5B:
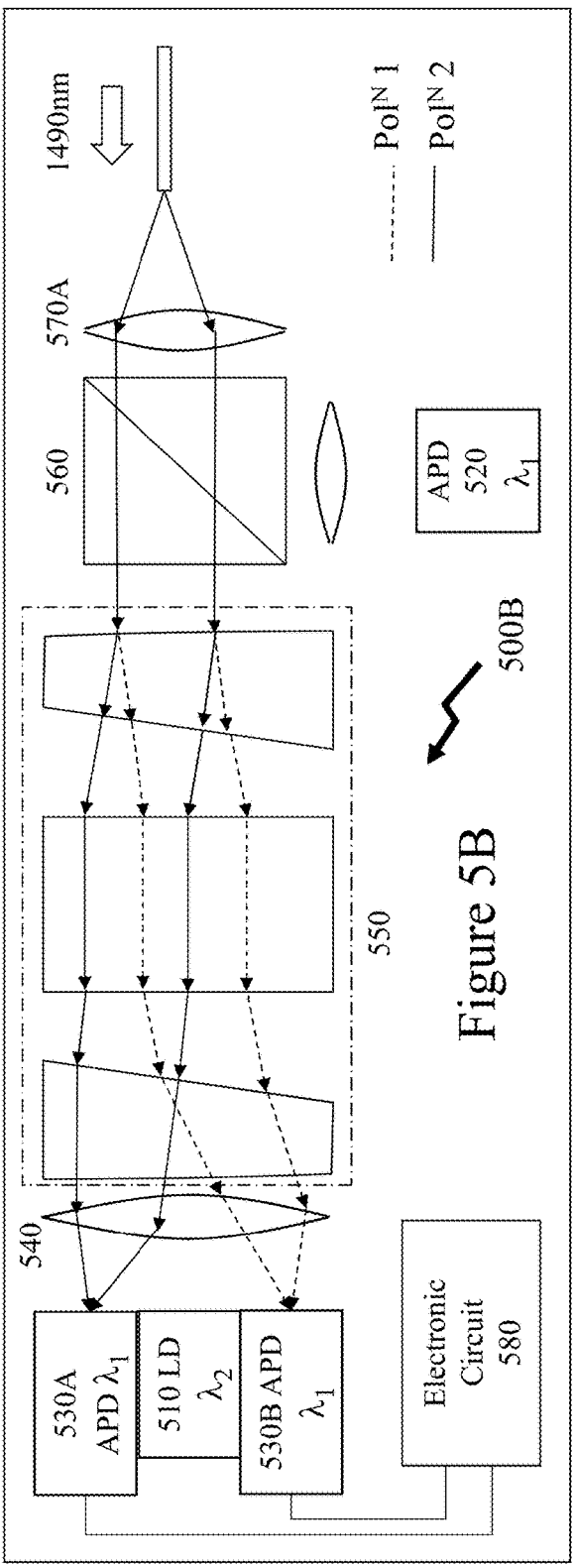

Now referring to FIGS. 5A and 5B there are depicted first and second schematics of embedded OTDR functionality within a receiver component according to an embodiment of the invention. The receiver component in common with embodiments of the invention described supra wherein an optical signal from an optical fiber (not identified for clarity) is coupled via WDM filter 560 to APD $\lambda_1$ 520. In this instance the optical signal is shown being collimated by first lens 570A from the optical fiber and focused by second lens 570B onto the APD $\lambda_1$ 520. Such collimating and focusing lenses may be employed within the preceding embodiments depicted in FIGS. 3A to 4B respectively but if employed have been omitted for clarity. In respect of FIG. 5A the optical path for the EOTDR transmit pulse is depicted. As depicted the optical signal from a laser source, LD $\lambda_2$ 510, is coupled via third lens 540 before being coupled to isolator 550 comprising first and second birefringent elements 550A and 550C respectively together with Faraday rotator element 550B. Accordingly, the optical signal is propagated through the isolator 550 and coupled through WDM filter 560 and first lens 570A to the optical fiber. Disposed either side of LD $\lambda_2$ 510 are first and second APDs APD $\lambda_1$ 530A and APD $\lambda_1$ 530B respectively but these play no part in the transmission action of the EOTDR.

Now referring to FIG. 5B the return path of the EOTDR pulse is depicted. Accordingly, optical signals at $\lambda_2$ reflected and/or backscattered from the optical fiber are coupled back through first lens 570A and WDM filter 560 to the isolator 550. However, now due to the 90° rotation of their polarization within the Faraday rotator element 550B the combined effect of this together with the first and second birefringent elements 550A and 550C respectively leads to the optical paths of the TE and TM polarizations being focused by the third lens 540 onto the first and second APDs APD $\lambda_1$ 530A and APD $\lambda_1$ 530B respectively rather than back to the LD $\lambda_2$ 510. The electrical signals from the first and second APDs APD $\lambda_1$ 530A and APD $\lambda_1$ 530B respectively are coupled to electronic circuit 580 and therein a processed signal is provided to external control circuits.

Figure 6A:
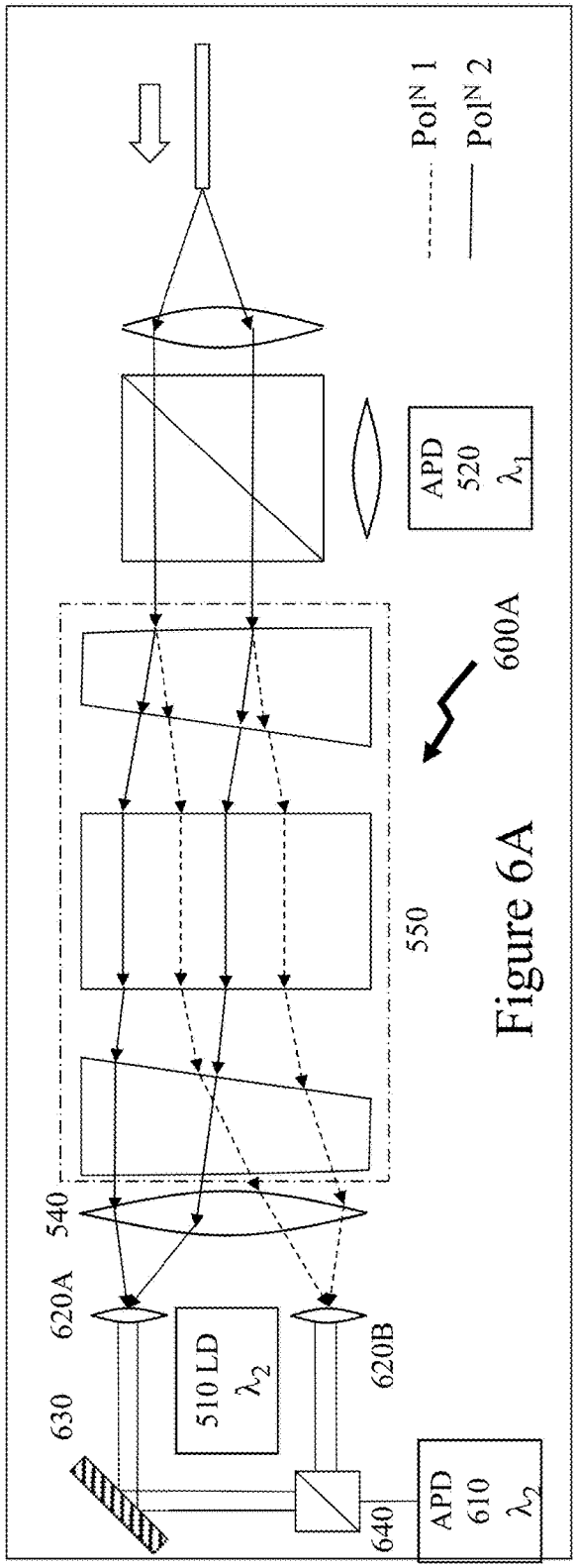
FIGS. 6A and 6B depict schematics of embedded OTDR functionality within receiver components according to embodiments of the invention.
Figure 6B:
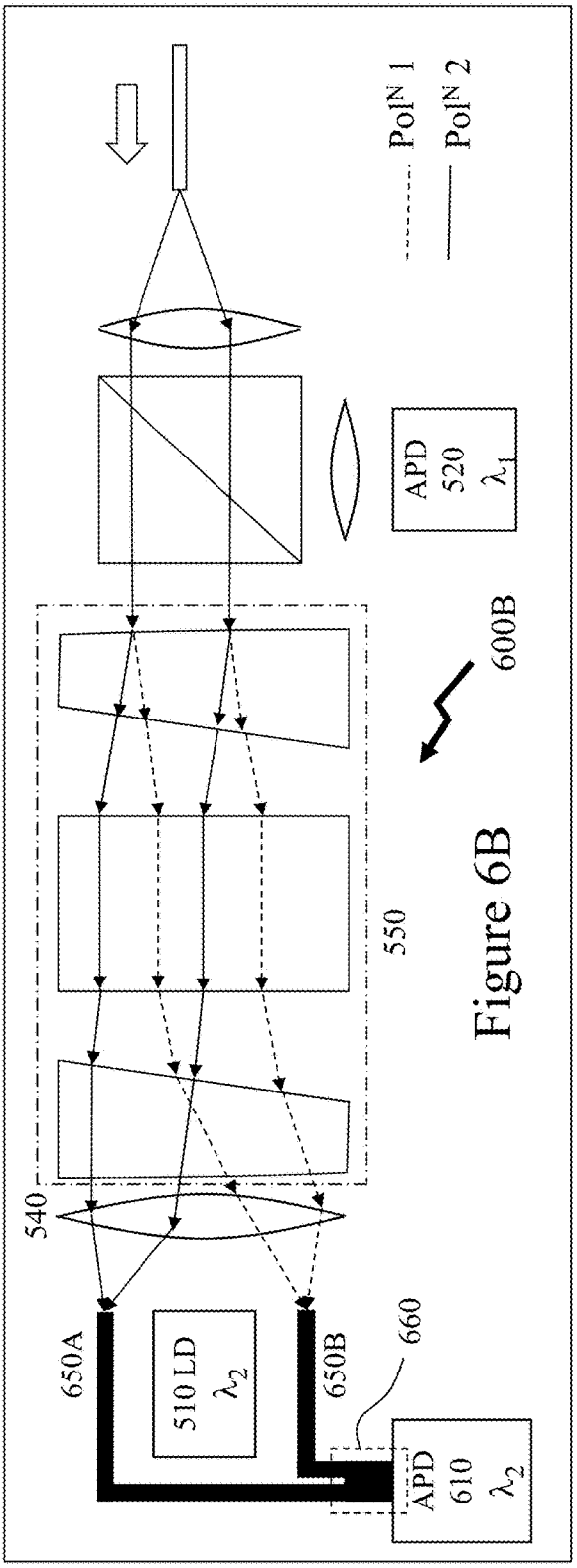

Now referring to FIGS. 6A and 6B there are depicted first and second variant schematics 600A and 600B respectively of embedded OTDR (EOTDR) functionality within an optical receiver component such as depicted supra in respect of FIGS. 5A and 5B respectively. According in each of first and second variant schematics 600A and 600B signals at a first wavelength or wavelength range $\lambda_1$ would be coupled to APD $\lambda_1$ 520. The EOTDR in transmit exploits LD $\lambda_2$ 510 and the returned signals at $\lambda_2$ are now coupled via free space optics to the receiver APD, APD $\lambda_2$ 610. Accordingly, first and second collimating lenses 620A and 620B collimate the reverse direction polarization signals focused by the third lens 540. The polarization coupled via first collimating lens 620A is reflected by mirror 630 before being coupled via polarizing beamsplitter 640 to APD $\lambda_2$ 610. The polarization coupled via second collimating lens 620B is coupled via polarizing beamsplitter 640 to APD $\lambda_2$ 610. As the polarizations are orthogonal they are both coupled via the polarizing beamsplitter 640 to APD $\lambda_2$ 610 with low loss.

Figure 7A:
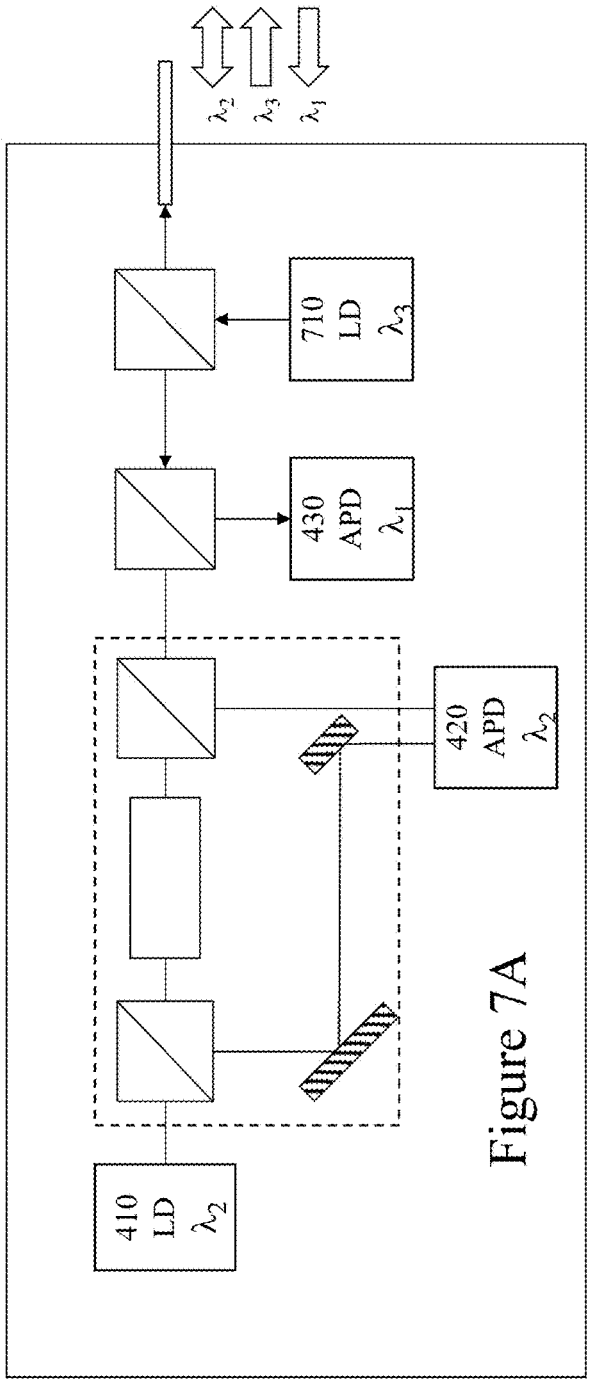
FIGS. 7A and 7B depict schematics of embedded OTDR functionality within diplexer components according to embodiments of the invention.
Figure 7B:
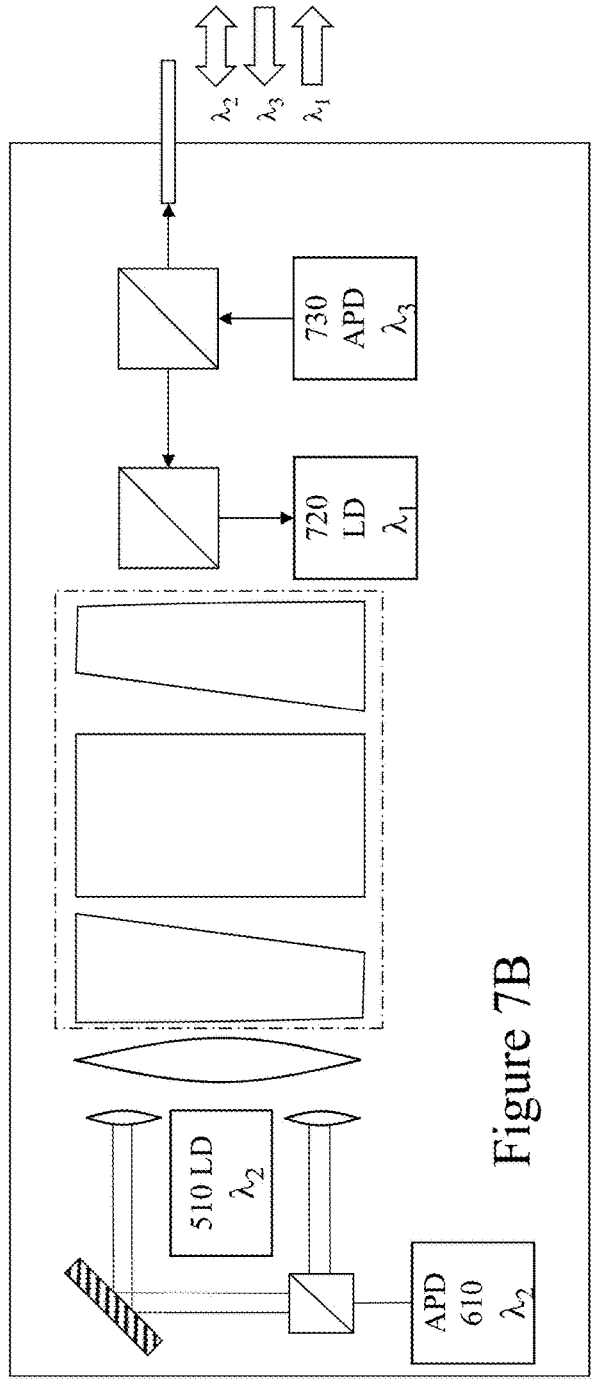

In second variant schematic 600B the two orthogonal polarizations in the return signal path at $\lambda_2$ are coupled to first and second optical fibers 650A and 650B respectively which are then combined in combiner 660 before being coupled to APD $\lambda_2$ 610. Combiner 660 may for example be a singlemode to multimode coupler where the first and second optical fibers 650A and 650B are singlemode. Referring to FIGS. 7A and 7B there are depicted first and second schematics 700A and 700B of embedded OTDR functionality within diplexer components according to embodiments of the invention. As depicted first schematic 700A depicts a diplexer operating with upstream receiver operating at $\lambda_1$, downstream transmitter at $\lambda_3$, and EOTDR at $\lambda_2$ wherein the EOTDR exploits an optical configuration similar to that depicted in FIGS. 4A and 4B respectively. Second schematic 700B depicts a diplexer operating with upstream receiver operating at $\lambda_3$, downstream transmitter at $\lambda_1$, and EOTDR at $\lambda_2$ wherein the EOTDR exploits an optical configuration similar to that depicted in FIGS. 5A through 6B respectively.

Within the embodiments of the invention free space solutions provide for low loss coupling of the optical pulse source from the optical transmitter, receiver, or transceiver with embedded OTDR and for low loss coupling of the reflected and/or backscattered OTDR signal to one or more optical detectors thereby removing the insertion loss penalty of the prior art beamsplitter solutions. It would be evident to one skilled in the art that the different optical designs presented may be implemented as free space discrete components, e.g. with packaged optoelectronic components within a housing, or as a micro-bench for example exploiting silicon micromachining and opto-electronic die placement via flip-chip bonding etc. for example.

Embodiments of the invention such as depicted in FIG. 6B for example with an micro-bench implementation may replace the first and second optical fibers 650A and 650B respectively together with combiner 660 may be implemented with optical waveguides, e.g. silica, silicon, or silicon oxynitride for example. Similarly, first to third lenses 540, 570A and 570B respectively may be implemented using ball lenses Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
   a first optical emitter emitting at first predetermined wavelength;
   a first optical receiver for receiving optical signals at the first predetermined wavelength;
   a wavelength division multiplexer having a first port relating to optical signals at the first predetermined wavelength, a second port relating to optical signals at a second predetermined wavelength; and a third port relating to optical signals at both the first and second predetermined wavelengths;
   an optical sub-assembly coupled between the first optical emitter and the first port of the wavelength division multiplexer comprising a fourth port for receiving optical signals from the first optical emitter and coupling them to the first port of the wavelength division multiplexer and a fifth port for coupling optical signals from first port of the wavelength division multiplexer to the first optical receiver; and
   a second optical receiver for receiving optical signals at the first predetermined wavelength, and wherein
   the optical sub-assembly comprises first and second birefringent elements disposed inline and either side of a magneto-optical component providing Faraday rotation of signals propagating in one direction and not in the other and the first and second optical receivers are coupled to the optical sub-assembly on the same side as the first optical emitter and each receive signals at the first predetermined wavelength but in orthogonal polarizations.

2. The device according to claim 1, further comprising a second optical receiver coupled to the second port of the wavelength division multiplexer for receiving optical signals at the second predetermined wavelength coupled to the third port of the wavelength division multiplexer.

3. The device according to claim 1, further comprising a second optical emitter coupled to the second port of the wavelength division multiplexer for generating optical signals at the second predetermined wavelength which are coupled to the third port of the wavelength division multiplexer.

4. The device according to claim 1, further comprising a second optical receiver for receiving optical signals at the first predetermined wavelength; wherein
   the optical sub-assembly comprises first and second polarization splitting components disposed inline and either side of a magneto-optical component providing Faraday rotation of signals propagating in one direction and not in the other and the first and second optical receivers are coupled to the first and second polarizing splitting components.

5. The device according to claim 4, wherein
   the magneto-optical component rotates optical signals at the first predetermined wavelength propagating from the wavelength division multiplexer to the first emitter; and
   the first and second polarizing splitting components separate the orthogonal polarization to the polarization axis of the first optical emitter.

6. The device according to claim 1, wherein
   the optical sub-assembly comprises first and second polarization splitting components disposed inline and either side of a magneto-optical component providing Faraday rotation of signals propagating in one direction and not in the other and the first and second optical receivers are coupled to the first and second polarizing splitting components.

7. The device according to claim 6, wherein
   the magneto-optical component rotates optical signals at the first predetermined wavelength propagating from the wavelength division multiplexer to the first emitter;
   the first and second polarizing splitting components separate the orthogonal polarization to the polarization axis of the first optical emitter and the separated optical signals in the orthogonal polarization are combined at least one of prior to or at the first optical receiver.

8. A device comprising:
   a first optical emitter emitting at first predetermined wavelength;
   a first optical receiver for receiving optical signals at the first predetermined wavelength;
   a wavelength division multiplexer having a first port relating to optical signals at the first predetermined wavelength, a second port relating to optical signals at the first predetermined wavelength; and a third port relating to optical signals at both the first and second predetermined wavelengths;

an optical sub-assembly coupled between the first optical emitter and the first port of the wavelength division multiplexer comprising a fourth port for receiving optical signals from the first optical emitter and coupling them to the first port of the wavelength division multiplexer and a fifth port for coupling optical signals from the wavelength division multiplexer to the first optical receiver; and first and second optical couplers are coupled to the optical sub-assembly on the same side as the first optical emitter and each receive signals at the first predetermined wavelengths but in orthogonal polarizations; wherein the optical signals from the first and second optical couplers are combined at least one of prior to or at the first optical receiver.

9. The device according to claim 8, further comprising a second optical receiver coupled to the second port of the wavelength division multiplexer for receiving optical signals at the second predetermined wavelength coupled to the third port of the wavelength division multiplexer.

10. The device according to claim 8, further comprising a second optical emitter coupled to the second port of the wavelength division multiplexer for generating optical signals at the second predetermined wavelength which are coupled to the third port of the wavelength division multiplexer.

11. The device according to claim 8, further comprising a second optical receiver for receiving optical signals at the first predetermined wavelength; wherein the optical sub-assembly comprises first and second polarization splitting components disposed inline and either side of a magneto-optical component providing Faraday rotation of signals propagating in one direction and not in the other and the first and second optical receivers are coupled to the first and second polarizing splitting components.

12. The device according to claim 11, wherein the magneto-optical component rotates optical signals at the first predetermined wavelength propagating from the wavelength division multiplexer to the first emitter; and the first and second polarizing splitting components separate the orthogonal polarization to the polarization axis of the first optical emitter.

13. The device according to claim 8, wherein the optical sub-assembly comprises first and second polarization splitting components disposed inline and either side of a magneto-optical component providing Faraday rotation of signals propagating in one direction and not in the other and the first and second optical receivers are coupled to the first and second polarizing splitting components.

14. The device according to claim 13, wherein the magneto-optical component rotates optical signals at the first predetermined wavelength propagating from the wavelength division multiplexer to the first emitter;

the first and second polarizing splitting components separate the orthogonal polarization to the polarization axis of the first optical emitter and the separated optical signals in the orthogonal polarization are combined at least one of prior to or at the first optical receiver.

* * * * *